United States Patent
Felden

[15] 3,668,035
[45] June 6, 1972

[54] PROCESS FOR ADHESIVE BONDING OF POLYVINYL CHLORIDE MATERIALS

[72] Inventor: Alois Felden, Munich, Germany
[73] Assignee: Stahlgruber Otto Gruber & Co., Munchen, Germany
[22] Filed: Apr. 24, 1969
[21] Appl. No.: 819,101

[30] Foreign Application Priority Data

Apr. 25, 1968 Germany..................P 17 69 245.4

[52] U.S. Cl.....................156/249, 156/256, 156/309, 156/320, 156/331
[51] Int. Cl.................................................B32b 31/00
[58] Field of Search..............156/283, 256, 241, 309, 230, 156/249, 250, 331, 310, 320

[56] References Cited

UNITED STATES PATENTS

| | | | |
|---|---|---|---|
| 3,032,460 | 5/1962 | Chipman et al.........................156/310 X |
| 3,075,863 | 1/1963 | Frey........................................156/310 X |
| 3,348,995 | 10/1967 | Baker et al.............................156/283 X |

*Primary Examiner*—Carl D. Quarforth
*Assistant Examiner*—Stephen J. Lechert
*Attorney*—Connolly and Hutz

[57] ABSTRACT

A process for the adhesive bonding of PVC materials includes preparing at least of the bonding surfaces by purifying and/or roughening and coating with the adhesive, while the other surface which was provided with a completely dry adhesive coating is applied to and pressed against the moist adhesive surface.

27 Claims, No Drawings

3,668,035

PROCESS FOR ADHESIVE BONDING OF POLYVINYL CHLORIDE MATERIALS

BACKGROUND OF INVENTION

The good mechanical and chemical properties of synthetic materials on PVC bases have led to producing objects from this synthetic material, such as conveyer belts, driving belts or water-tight work shoes, which until now have predominantly been made of rubber. However, a considerable disadvantage connected with such objects was that—in contrast to the repair of rubber objects which can easily and quickly be repaired in cold vulcanization or adhesion processes—the repairs of damages, such as holes or rips in objects made of synthetic material on PVC bases until now have led to take place by means of the so-called heat-sealing, i.e. by the use of heat and pressure. This is first of all disadvantageous, because for such a repair special auxiliary means are required which often are not immediately at hand and therefore necessitate transporting the object to a repair workshop. This is very cumbersome and time-consuming in the repair of conveyer belts, for instance, and leads to costly operation interruptions. In conveyer belts there is the further circumstance that a continuous joining must occur either on the spot by means of a portable heat-sealing device or in a workshop after cumbersome changing of the continuous conveyer belt. This is particularly essential in underground mining, since there the heating arrangements required for the heat-sealing are subjected to extraordinarily strict safety measures because of the danger of explosion, so that it is often preferred to utilize troublesome arrangements which enable exchanging the continuous conveyor belt.

These troublesome repair methods brought about the endeavor of producing, based on the processes customary in the repair of rubber objects, a joining of the synthetic material object to be repaired with the repair body by cold means in the adhesive process.

The development of new kinds of adhesive, e.g. on the hycar basis, on the polyurethane basis or on the neoprene basis, which have good adhesion with polyvinyl chloride materials, and in particular have the possibility of using non-combustible solvents for these adhesives, such as trichloroethylene, enable the introduction of these processes in practice next to the so-called "heat-sealing processes."

Despite this, they are still very troublesome, since both surfaces to be cemented must be prepared, i.e. purified, usually also roughened and coated with the adhesive, and only after a certain time, in which the solvents have for the most part evaporated, can they be joined together. In this connection, attention must also be paid that the adhesive application does not fully dry, since then a certain adhesive bonding is no longer possible. The correct time for the joining together depends on the adhesive substance, the temperature and the air humidity and must be maintained as precise as possible in order to assure certain bonding.

If it is considered that repairs of conveyor belts, for example, but also of rubber boots, must be carried out on the spot often in dusty and moist or wet places, it becomes apparent that exactly these requirements are fulfilled only with difficulty in practice after considerable, but not complete, evaporation of the solvents, in addition to which this time element of the drying of the adhesive coating the covered areas are subjected usually to a pollution very injurious for good bonding, e.g. due to dust effects.

SUMMARY OF INVENTION

An object of this invention is to eliminate the above-mentioned disadvantages or at least to lessen them considerably.

A further object of this invention is to provide an adhesive bonding process in which pretreatment is simplified and the time element required for bonding and the pollution danger are lessened.

This problem is solved by the invention in that at most one of the surfaces to be bonded is prepared, in a manner known per se, by purifying and/or roughening for the bonding and is coated with an adhesive, while the second surface, provided with a completely dry adhesive coating, is applied and pressed on to the still moist first adhesion surface area.

DETAILED DESCRIPTION

As indicated above, in accordance with this invention one surface is coated with a moist adhesive and the other surface with a completely dry adhesive. The solvents present in the still moist adhesive coating of the first adhesion surface area dissolve the predried adhesive layer of the second surface and effect an extremely quick and at the same time a very firm adhesive bonding. By the use of a pretreated and a precoated adhesive surface, not only is the preparation and coating with adhesive eliminated but also the time for the drying of the adhesive at the first adhesion surface, treated in customary manner, can be considerably shortened or the joining of the adhesion surface areas can usually be undertaken immediately after a completed application of adhesive, so long as the adhesive was applied sufficiently thinly. In this manner, on the one hand, the danger of a pollution of the adhesion surface areas is at least considerably reduced, while on the other hand considerable time saving is possible, since two adhesion areas no longer have to be prepared and waiting is no longer necessary until the adhesive application is extensively but not entirely dry.

The second adhesive area already coated with adhesive can be prepared long before the adhesion and, so long as this concerns prefabricated objects, such as repair patches or strips of repair material, PVC-plates for floorings, shoe soles to be glued on, or the like, can be delivered from the manufacturer with the adhesive coating. This coating is then, in an advantageous manner, protected from soiling by a protective film, a metal foil for example, consisting of a material which does not adhere to the adhesive and can easily be removed prior to the gluing together.

In accordance to a further invention characteristic, it is also possible to provide both surfaces to be glued in the above-stated manner with a dry adhesive coating. However, in this instance, a slight heating of the surfaces to be glued is required, the heating being far below the melting temperature of the PVC material. Temperatures of 30° to 60°C are entirely sufficient here, so that even in this instance heating arrangement can usually be avoided, and the heating can occur by placing the material upon warm machine parts for short periods before the protective foil is pulled from the adhesive area.

The invention relates also to a process for the preparation of a plate-, strip- or tape-shaped layered material, where according to the invention first a silicon paper tape is coated with adhesive, by means of a coating machine for example, and after the evaporation of the solvent, the dry adhesive layer loosening from the silicon paper, by pressing with the material to be coated, is joined together at elevated temperature, which, however, is below the melting temperature of the material to be coated but is in the range of its softening temperature. This can take place in that the dry adhesive layer together with the material to be coated is conducted between heated press rollers.

It is often desired to protect the adhesive layer of such a layered material in transporting and storing, and in these cases the free adhesive surface of the adhesive layer is protected by a covering film e.g. a metal foil, which is pulled off prior to the adhesion. This can occur in that the dry adhesive layer between the material to be coated and a covering film is conducted through the heated press rollers.

Needless to say, not only plate-, band-, or tape-shaped material can be coated in the above-described manner but individual pieces can also be coated, such as floor tiles or repair patches, for example, and in these instances, pieces corresponding in form to the objects to be prepared are punched both from the material to be covered as well as from the dry adhesive layer loosened from the silicon paper and are joined together under heated press dies. Even in these instances it is possible to cover the free side of the adhesive layer with corresponding punched pieces of a covering film.

Particularly in the preparation of repair patches, it is suitable to make the pieces to be punched from the adhesive layer somewhat larger than the corresponding pieces of the material to be coated, so that in the finished repair patch the adhesive layer protrudes slightly all around the patch body, consisting of reinforced PVC material. The temperature of the punch die in this connection is preferably so adjusted that the PVC material of the patch body does not melt but yet becomes soft, so that edgy transitions between patch body and adhesive layer are avoided and a gradually tapered, scarfed edge results.

In the preparation of layered material, in which the one surface of the adhesive layer is covered by a covering film, a tape of the material provided as covering film is furnished with a uniform adhesive coating by means of a known coating machine and thereupon a tape of the material to be coated is applied on this covering film coated with adhesive, and the whole, as described, is passed through between heated press rollers. In this instance also the heating must remain below melting temperature of the PVC material. From the tape coated with adhesive in this manner and covered with a film, e.g. a metal foil, strips or even repair patches or floor tiles can then be cut out or punched in the corresponding size.

Of course, here it is possible again, particularly in repair patches, to coat with adhesive pieces of the covering film punched out in corresponding form and size and then to place thereupon and equally punched out piece of the PVC material and to undertake the drying of the adhesive coating by means of heated press dies. In this connection, the PVC pieces are preferably punched smaller than the surface of the covering film coated with adhesive, so that in pressing under the heated press die with slight deformation of the PVC material as the case may be, there result patches with a scarfed edge, the adhesive layer protruding slightly all around the edge of the patch.

In all these instances, a disadvantage often observed in the usual adhesion method is avoided, i.e. the disadvantage that a very thin PVC film, which prepared for adhesion is coated with adhesive, becomes curled, so that in the adhesion there often result air pockets which lower the durability of the adhesion, and in the repair of inflatable objects, for example, such as balls, air rafts, or air mattresses, prevent the desired sealing of a hole- or rip-shaped damage.

Of course, not only film strips or plates of pure PVC material can be coated in the novel manner, but also the PVC material can be reinforced by an embedded webbing, for example.

It is also possible to coat a webbing itself with adhesive according to the novel manner, which is advantageous in conveyer belt repair, for example. Here a webbing coated with adhesive on one side can be introduced. In this connection, the damaged spot is prepared for the repair by cutting out, purifying and roughening, coated with adhesive, thereupon a layer of the coated webbing, and indeed in such a manner that the coated side rests on the fresh adhesion application. The uncoated side of the webbing is also coated with adhesive and either covered with the coated side of a further webbing layer or with the side coated with adhesive of a PVC strip. Even in these cases, there results a noteworthy time saving and simplification of the repair and in particular a more secure adhesion as a result of the considerably decreased danger of pollution. The invention can therefore be applied in a particularly advantageous manner even in the underground repairing of conveyer belts.

A further advantage of the invention is also seen in the possibility of introducing special additives, for example for the increase in the heat stability in the adhesion without impairing the storage time of the precoated material. These additives can be admixed to the adhesive to be applied to the not yet coated adhesive surface and in reactivating of the adhesive of the coated surface shifts over into this layer, so that the advantages of such additives remain fully protected.

According to the above-described novel process, the invention also includes plates, strips, repair patches as well as webbing and film tapes coated and protected against soiling by means of covering films. As used in the claims the term "flat material" means plates, bands, tapes, webbings, repair patches or other similar materials. Additionally, the term "preadhesive preparing" is used to mean purifying and/or roughening for bonding.

What is claimed is:

1. A process for the adhesive bonding of polyvinyl chloride materials wherein each of the surfaces to be bonded is provided with an adhesive coating selected from the group consisting of polyurethane, neoprene and artificial caoutchoucs based adhesive, the adhesive coating on one of the surfaces to be bonded being dry by full evaporation of the solvents of said adhesives while the second surface is being prepared for the bonding, said second surface being prepared for the bonding by coating with said adhesive while said adhesive is moist by containing its solvents, and the first dry surface and second moist surface then being pressed together while the second surface is still moist.

2. A process for the adhesive bonding of polyvinyl chloride materials wherein each of the surfaces to be bonded is provided with an adhesive coating selected from the group consisting of polyurethane, neoprene and artificial caoutchoucs based adhesive, each of the coatings being dry by full evaporation of the solvents of the adhesive, the coatings then being heated to a temperature below the melting point of the polyvinyl chloride material, and the surfaces then being joined together under pressure.

3. The process of claim 2, wherein the surfaces are heated to a temperature between 30° and 60°C.

4. A process according to claim 1 wherein said coating of a dry adhesive is produced by first applying the adhesive on a silicon paper tape, permitting the solvents to evaporate, then transferring said coating from the silicon paper tape to the polyvinyl chloride surface to be coated, and then pressing the dry adhesive onto said surface at increased temperature.

5. A process according to claim 2 wherein said coating of a dry adhesive is produced by first applying the adhesive on a silicon paper tape, permitting the solvents to evaporate, then transferring said coating from the silicon paper tape to the polyvinyl chloride surface to be coated, and then pressing the dry adhesive onto said surface at increased temperature.

6. A process according to claim 4, wherein said pressing is accomplished by covering said dry adhesive on the side of said surface to be coated of said polyvinyl chloride material and on the other side by a suitable covering film of a material which will not permanently adhere to the adhesive coating and conducting them between heated pressing rollers.

7. A process according to claim 5, wherein said pressing is accomplished by covering said dry adhesive on the side of said surface to be coated of said polyvinyl chloride material and on the other side by a suitable covering film of a material which will not permanently adhere to the adhesive coating and conducting them between heated pressing rollers.

8. A process according to claim 6, wherein pieces of the dry adhesive material corresponding in size and form with said polyvinyl chloride material to be precoated are punched out and covered with a correspondingly shaped piece of said film and then joined together.

9. A process according to claim 7, wherein pieces of the dry adhesive material corresponding in size and form with said polyvinyl chloride material to be precoated are punched out and covered with a correspondingly shaped piece of said film and then joined together.

10. A process according to claim 8, wherein the joining is performed by heated pressing means.

11. A process according to claim 9, wherein the joining is performed by heated pressing means.

12. A process according to claim 1, wherein a film of a material which slightly adheres to, but does not firmly join with the adhesive selected from the group consisting of polyurethane, neoprene or artificial caoutchoucs, is coated with such adhesive and after the solvents have evaporated is covered by the polyvinyl chloride material and firmly joined therewith by heat and pressure, said film serving as a protective covering foil.

13. A process according to claim 2, wherein a film of a material which slightly adheres to, but does not firmly join with the adhesive selected from the group consisting of polyurethane, neoprene or artificial caoutchoucs, is coated with such adhesive and after the solvents have evaporated is covered by the polyvinyl chloride material and firmly joined therewith by heat and pressure, said film serving as a protective covering foil.

14. A process according to claim 12, wherein said protective covering foil corresponds in size and shape with said polyvinyl chloride material to be coated.

15. A process according to claim 13, wherein said protective covering foil corresponds in size and shape with said polyvinyl chloride material to be coated.

16. A process according to claim 12, wherein said protective covering foil corresponds in shape, but exceeds in size said polyvinyl chloride material so that the adhesive coating protrudes slightly all around the polyvinyl chloride body of the patch.

17. A process according to claim 13, wherein said protective covering foil corresponds in shape, but exceeds in size said polyvinyl chloride material so that the adhesive coating protrudes slightly all around the polyvinyl chloride body of the patch.

18. A process according to claim 16, wherein during the process of joining said polyvinyl chloride material with said dry adhesive on said protective covering foil under heated pressing means, the heat is raised to such an extent that the polyvinyl chloride material is softened and the resulting product is a patch scarfed at its edge and tapered from the middle outwards.

19. A process according to claim 17, wherein during the process of joining said polyvinyl chloride material with said dry adhesive on said protective covering foil under heated pressing means, the heat is raised to such an extent that the polyvinyl chloride material is softened and the resulting product is a patch scarfed at its edge and tapered from the middle outwards.

20. A process according to claim 4, wherein said polyvinyl chloride material a surface of which is to be coated by that dry adhesive is in the form of a webbing of polyvinyl chloride fibers.

21. A process according to claim 5, wherein said polyvinyl chloride material a surface of which is to be coated by that dry adhesive is in the form of a webbing of polyvinyl chloride fibers.

22. A process according to claim 12, wherein said polyvinyl chloride material a surface of which is to be coated by that dry adhesive is in the form of a webbing of polyvinyl chloride fibers.

23. A process according to claim 13, wherein said polyvinyl chloride material a surface of which is to be coated by that dry adhesive is in the form of a webbing of polyvinyl chloride fibers.

24. A process according to claim 4, wherein said polyvinyl chloride material a surface of which is to be coated by said dry adhesive is in the form of a sheet comprising a reinforcement of embedded webbing.

25. A process according to claim 5, wherein said polyvinyl chloride material a surface of which is to be coated by said dry adhesive is in the form of a sheet comprising a reinforcement of embedded webbing.

26. A process according to claim 12, wherein said polyvinyl chloride material a surface of which is to be coated by said dry adhesive is in the form of a sheet comprising a reinforcement of embedded webbing.

27. A process according to claim 13, wherein said polyvinyl chloride material a surface of which is to be coated by said dry adhesive is in the form of a sheet comprising a reinforcement of embedded webbing.

* * * * *